United States Patent Office 3,093,636
Patented June 11, 1963

3,093,636
INTERMEDIATES IN THE CONVERSION OF 11α-HYDROXY-DIOSGENIN TO CORTISONE
Carl Djerassi, Otto Halpern, and Octavio Mancera, Mexico City, Mexico, assignors, by mesne assignments, to Syntex Corporation, a corporation of Panama
No Drawing. Filed Oct. 3, 1958, Ser. No. 765,056
Claims priority, application Mexico Oct. 4, 1957
22 Claims. (Cl. 260—239.55)

The present invention relates to cyclopentanophenanthrene compounds and to a novel process relating thereto.

More particularly, the present invention relates to a novel process for the production of cortisone, or other cortical hormones which may be derived therefrom, starting with 11α-hydroxy diosgenin and to certain novel intermediates.

In U.S. Patent No. 2,776,969, granted January 8, 1957, there is disclosed and claimed 11α-hydroxy-diosgenin ($\Delta^5$-22-isospirosten-3β-11α-diol) as well as certain esters thereof and a method for the preparation thereof.

In accordance with the present invention we have discovered that 11α-hydroxy-diosgenin may be converted into cortisone by a process involving as a first step the partial acylation at C-3 to form the 3-monoesters of 11α-hydroxy-diosgenin. The 3-monoesters are then oxidized to produce 11-keto-diosgenin esters. Degradation of the side chain of these compounds gives the corresponding novel 3-esters of $\Delta^{5,16}$-pregnadien-3β-ol-11,20-dione which are then epoxidized to form the novel key intermediate 16α,17α-oxido-$\Delta^5$-pregnen-3β-ol-11,20-dione. If the preferred oxidizing agent, alkaline hydrogen peroxide is used, the ester group at C-3 is saponified in this step. The compound thus formed is then reesterified at C-3.

As previously set forth, the 16α,17α-oxido compound and its esters just referred to are the key intermediates for the remainder of the present novel process which involves the further steps of bromination both to protect the 5,6 double bond and in position 21 (in one modification bromination at C-12 is also produced), reaction of HBr with the oxido group at 16,17 to prepare the 17α-hydroxy-16-bromo compounds, substitution of the 21-bromo by iodine and subsequently by acetate, oxidation of the 3-hydroxy group to a 3-keto group, reconstitution of the 5,6-double bond and removal of bromo groups from C-16 and C-12.

That portion of the process of the present invention involving the production of esters of 16α,17α-oxido-$\Delta^5$-pregnen-3β-ol-11,20-dione is illustrated by the following equation:

In the above equation R represents an ester group of a hydrocarbon carboxylic acid of less than 12 carbon atoms. These may be those conventional in the art i.e. aliphatic, cyclic or mixed cyclic-aliphatic. In general however, for the process the lower fatty acid esters are desirably used such as acetate or propionate and R may desirably represent these acyl groups.

In practicing the steps above set forth the hydroxyl group at C-3 of 11α-hydroxy diosgenin was selectively esterified by treating the free compound with slightly over one molar equivalent of a lower fatty acid anhydride such as acetic anhydride in pyridine solution and at a temperature substantially below room temperature. The 3-mono lower fatty acid esters of 11α-hydroxy-diosgenin thus prepared, were then oxidized by an oxidizing agent for secondary hydroxyl groups, chromium trioxide in aqueous acetic acid solution, for example to form 11-keto-diosgenin lower fatty acid esters. Oxidative degradation of the sapogenin side chain by the usual methods i.e. heating under pressure with a lower fatty acid anhydride (preferably acetic) and treatment with chromium trioxide in acetic acid etc. gave the 3-lower fatty acid esters of $\Delta^{5,16}$-pregnadien-3β-ol-11,20-dione. The 16,17-double bond of these compounds were then epoxidized preferably with hydrogen peroxide in alkaline solution (i.e. alkali metal hydroxide) to give 16α,17α-oxido-$\Delta^5$-pregnen-3β-ol-11,20-dione since the ester group is simultaneously saponified. Conventional esterification with lower fatty acid anhydrides then gave the corresponding 3-lower fatty acid esters of this oxido compound.

The compounds just described are intermediates for the production of cortisone by further process steps illustrated by the following equation:

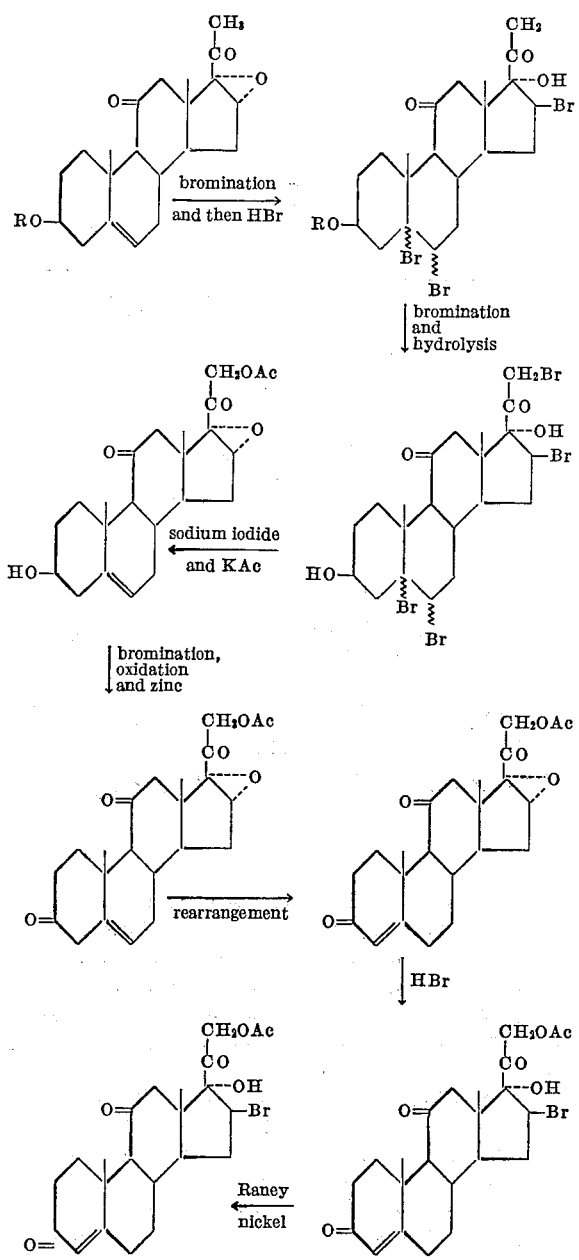

In the above equation R represents the same ester groups as heretofore set forth and Ac represents acetate.

At indicated in the above equation, the 3-esters, preferably lower fatty acid ester, of 16α,17α-oxido-Δ⁵-pregnen-3β-ol-11,20-dione are first brominated with bromine preferably in carbon tetrachloride to form the corresponding 5,6-dibromo compound i.e. the lower fattye acid esters of 5,6-dibromo-16α,17α-oxido-pregnan-3β-ol-11,20-dione. These compounds may be isolated conventionally or the reaction solution containing them treated directly with hydrogen bromide in glacial acetic acid to form the corresponding 3-lower fatty acid esters of 5,6,16β-tribromo-pregnan-3β,17α-diol-11,20-dione. Here again these intermediates may be recovered or the solution treated again with one more molar equivalent of bromine to form the corresponding 3-lower fatty acid esters of 5,6,16β,21-tetrabromo-pregnan-3β,17α-diol-11,20-dione. The 3-ester group of these compounds was then hydrolyzed with acid, such as dry hydrogen chloride in a lower aliphatic alcohol such as methanol, to give the free tetrabromo compound indicated in the equation.

Treatment of the free tetrabromo compound with sodium iodide in methanol or other lower aliphatic alcohol gave the corresponding 21-iodo compound with the 5,6-double bond reconstituted i.e. 16β-bromo-21-iodo-Δ⁵-pregnen-3β,17α-diol-11,20-dione. This compound when treated with potassium acetate gave the 21-acetate of 16α,17α-oxido-Δ⁵-pregnen-3β,21-diol-11,20-dione. Treatment of this oxido compound in methylene chloride with bromine at a temperature below room temperature gave the corresponding 5,6-dibromo compound which was then oxidized to the corresponding 3-ketone to thus prepare (after removal of the 5,6-dibromo groups with zinc) the 21-acetate of 16α,17α-oxido-Δ⁵-pregnen-21-ol-3,11,20-trione. Treatment with strong mineral acid such as hydrochloric acid rearranged the Δ⁵-double bond to the Δ⁴-double bond as indicated. Finally reaction of the 16α,17α-oxido group with hydrogen bromide and exchange of the 16β-bromo for hydrogen by means of Raney nickel gave cortisone acetate.

Another modification of the process of the present invention starting with the same oxido compound and involving the production of intermediate 12-bromo compounds is illustrated in the following equation:

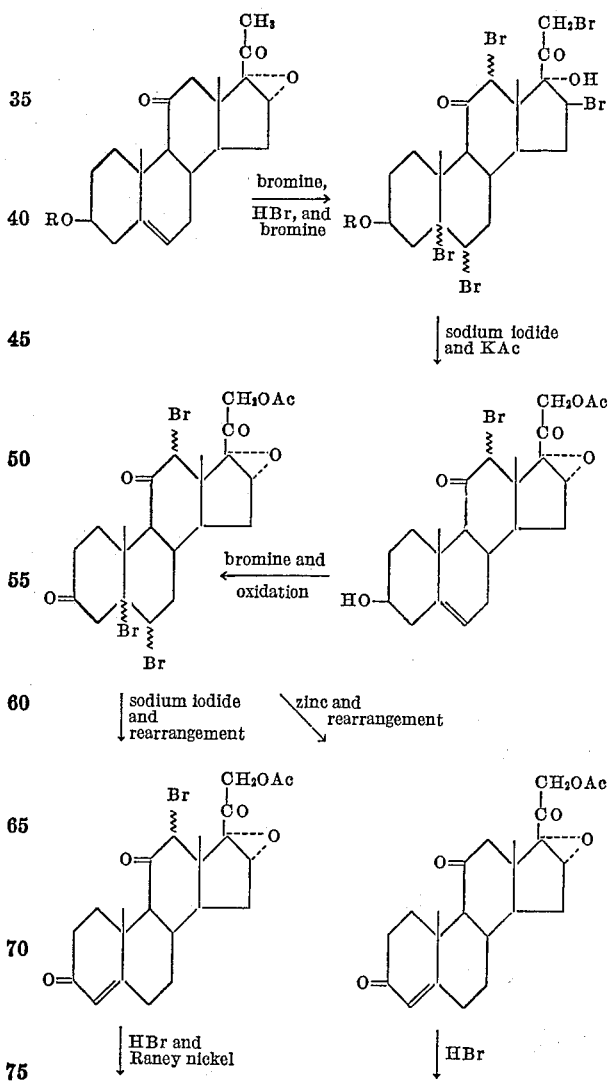

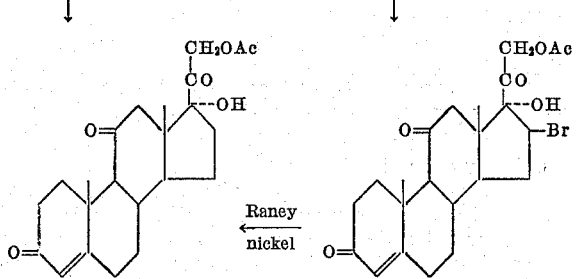

In the above equation R and Ac represent the same groups as heretofore.

As indicated above the modification illustrated differs from that previously described in that the double bond of the starting material is first brominated, then treated with HBr and then again treated with bromine to form the 3-lower fatty acid esters of 5,6,12,16β,21-pentabromo-pregnan-3β,17α-diol-11,20-dione. These esters are then hydrolyzed to the free compound and this treated with sodium iodide to form 12,16β-dibromo-21-iodo-Δ⁵-pregnen-3β,17α-diol-11,20-dione. Treatment of this last compound with potassium acetate gave the 21-acetate of 12-bromo -16α,17α - oxido - Δ⁵ - pregnen - 3β,21 - diol-11, 20-dione. This compound was treated with bromine to give the corresponding 5,6,12-tribromo compound which was then oxidized to the 21-acetate of 5,6,12-tribromo - 16α,17α - oxido - pregnan - 21 - ol - 3,11,20-trione. From this compound, as indicated in the equation, the bromine could either be completely removed with zinc or partially removed with sodium iodide, followed by rearrangement as previously described to the corresponding Δ⁴-compounds. In any event the resulting 3-keto-Δ⁴-16α,17α-oxido compounds are treated in the same way by opening the epoxide with hydrogen bromide and treatment with Raney nickel to remove either bromine at C-16 or both at C-16 and C-12.

The following specific examples serve to illustrate but are not intended to limit the present invention.

*Example I*

A solution of 50 g. of Δ⁵-22a,25D-spirosten-3β,11α-diol (11α-hydroxy-diosgenin) in 200 cc. of pyridine was cooled to 0° C. and slowly treated, with stirring with 11.5 cc. of acetic anhydride, while the temperature was maintained at 0° C. The mixture was kept standing at a temperature around 0° C. for 6 hours, poured into water and extracted with ethyl acetate; the extract was consecutively washed with dilute hydrochloric acid, 5% sodium carbonate solution and water, dried over anhydrous sodium sulfate, filtered and evaporated to dryness. The residue consisted of 11α-hydroxy-diosgenin, 3-monoacetate. The analytical sample was obtained by chromatography.

45 g. of the crude 11α-hydroxy-diosgenin 3-acetate was dissolved in 500 cc. of 90% acetic acid and then slowly treated under stirring with a solution of 10 g. of chromium trioxide in 50 cc. of 80% acetic acid, which was added in the course of half an hour. The mixture was kept for 2 hours at room temperature, poured into ice water and extracted with ethyl acetate; the extract was washed with 5% sodium carbonate solution and water, dried over anhydrous sodium sulfate, filtered and evaporated to dryness. The residue was chromatographed on activated alumina and the crystalline fractions eluted were recrystallized from methanol. There was thus obtained 3β - acetoxy - Δ⁵ - 22a,25D - spirosten - 11-one, namely 11-keto-diosgenin acetate.

30 g. of this 11-keto-diosgenin acetate in 300 cc. of acetic anhydride was heated for 8 hours in a pressure bomb at 175–180° C. The mixture was poured into water and extracted with ether, and the extract was washed with water, dried over anhydrous sodium sulfate, filtered and evaporated to dryness. The residual oil was dissolved in 400 cc. of acetic acid and 420 cc. of ethylene dichloride, cooled to 15° C. and treated dropwise with a solution of 27 g. of chromium trioxide in 460 cc. of 80% acetic acid, with stirring and maintaining the temperature of the mixture below 15° C. After 2 hours at room temperature it was poured into water, extracted with chloroform, washed with water, dried over anhydrous sodium sulfate and evaporated to dryness. The residue was chromatographed in a column of unwashed alumina, thus producing Δ⁵,¹⁶-pregnadien-3β-ol-11,20-dione acetate.

A solution of 10 g. of Δ⁵,¹⁶-pregnadien-3β-ol-11,20-dione acetate in 700 cc. of methanol was cooled to 15° C. and then treated with 20 cc. of 4 N aqueous sodium hydroxide solution followed by 40 cc. of 30% aqueous hydrogen peroxide solution, under stirring and maintaining the temperature of the mixture below 15° C. It was kept overnight in the refrigerator and then poured into 2,750 cc. of ice water. The precipitate was collected by filtration, washed with water and dried, thus producing the crude 16α,17α-oxido-Δ⁵-pregnen-3β-ol-11,20-dione. The analytical sample was obtained by repeated crystallization from methanol.

10 g. of the crude 16α,17α-oxido-Δ⁵-pregnen-3β-ol-11, 20-dione was dissolved in 50 cc. of pyridine, mixed with 10 cc. of acetic anhydride and kept overnight at room temperature. After pouring into ice water the precipitate was collected, washed with water, dried and recrystallized from methanol, to yield 16α,17α-oxido-Δ⁵-pregnen-3β-ol-11,20-dione acetate.

A solution of 10 g. of 16α,17α-oxido-Δ⁵-pregnen-3β-ol-11,20-dione acetate in a mixture of 100 cc. of acetic acid and 100 cc. of carbon tetrachloride was cooled to 18° C. and treated with a solution of 4.2 g. of bromine in 30 cc. of carbon tetrachloride. There was thus formed a solution of 5,6-dibromo-16α,17α-oxido-pregnen-3β-ol-11,20-dione acetate. In another experiment this compound was isolated by concentrating the solution to dryness under reduced pressure and recrystallizing the residue from methanol.

The solution of 5,6-dibromo-16α,17α-oxido-pregnen-3β-ol-11,20-dione acetate, obtained as described above, was treated with 15 cc. of 32% solution of hydrogen bromide in glacial acetic acid, whereupon a solution of 5,6,16β-tribromo-pregnan-3β,17α-diol-11,20-dione acetate was formed. In another experiment the solution was concentrated under reduced pressure and the bromohydrin was isolated by crystallization of the residue from methanol.

The solution of 5,6,16β-tribromo-pregnan-3β,17α-diol-11,20-dione acetate obtained as described above was treated with 4.2 g. of bromine dissolved in 30 cc. of carbon tetrachloride, that is, with one more molar equivalent of bromine; the bromine solution was added with stirring at room temperature over a period of 40 minutes. The mixture was kept standing for 15 minutes further and then the carbon tetrachloride was removed under reduced pressure, avoiding overheating. The resulting suspension was poured into water and the precipitate formed was collected, washed with water and dried at 50° C. There was thus obtained the crude 5,6,16β,21-tetrabromo-pregnan-3β,17α-diol-11,20-dione 3-acetate. The analytical sample was obtained by recrystallization from methanol.

3 g. of the crude 5,6,16β,21-tetrabromo-pregnan-3β, 17α-diol-11,20-dione 3-acetate was covered with 100 cc. of methanol and a slow stream of dry hydrogen chloride was introduced into the mixture, with stirring and maintaining the temperature around 30° C. When the hydrolysis of the acetoxyl group was complete the color of the solution turned pale red and the stirring was continued for 45 minutes further. The mixture was diluted with water and the precipitate was filtered, washed with water and dried in vacuo, thus yielding the crude 5,6,16β,21-tetrabromo-pregnan-3β,17α-diol-11,20-dione. The analytical sample was obtained by recrystallization from methanol.

The above crude 5,6,16β,21-tetrabromo-pregnan-3β,17a-diol-11,20-dione was dissolved in 200 cc. of methanol, mixed with 34 g. of sodium iodide, stirred for minutes and then kept standing overnight. After diluting with water the iodination product was extracted with methylene chloride and the extract was washed with 3% sodium thiosulfate solution until decoloration, then with water and evaporated under reduced pressure, avoiding overheating. There was thus obtained 16β-bromo-21-iodo-Δ⁵-pregnen-3β,17α-diol-11,20-dione in crude form. The analytical sample was obtained by recrystallization from acetone-methanol at low temperature.

The crude 16β-bromo-21-iodo-Δ⁵-pregnen-3β,17α-diol-11,20-dione was dissolved in 300 cc. of acetone, treated with 40 g. of recently fused potassium acetate and the mixture was refluxed for 4 hours. It was then concentrated to a small volume, diluted with water and extracted with ether. The extract was washed with water, dried over anhydrous sodium sulfate, filtered and concentrated to a small volume. Upon cooling there crystallized 16α,17α-oxido-Δ⁵-pregnen-3β,21-diol-11,20-dione 21 - acetate. The analytical sample was obtained by recrystallization from acetone.

10 g. of 16α,17α-oxido-Δ⁵-pregnen-3β,21-diol-11,20-dione 21-acetate was dissolved in 50 cc. of methylene chloride, cooled to 10° C. and treated under stirring with 4.2 g. of bromine dissolved in 12 cc. of methylene chloride, in the course of 20 minutes and maintaining the temperature below 15° C. There was thus obtained a solution 5,6 - dibromo-16α,17α-oxido-pregnan-3β,21-diol-11,20-dione 21-acetate which was used for the next stage without isolation of the pure compound. The latter was obtained in another experiment by concentration of the methylene chloride solution under reduced pressure followed by crystallization of the residue from acetone.

To the solution of 5,6-dibromo-16α,17α-oxido-pregnan-3β,21-diol-11,20-dione 21-acetate, obtained as described above, there was added 100 cc. of 90% acetic acid and then 4 g. of chromium trioxide dissolved in 10 cc. of water, with stirring, in the course of half an hour and maintaining the temperature of the mixture below 25° C. It was then stirred for 1 hour further at room temperature, diluted with water and 200 cc. of methylene chloride and the aqueous phase was re-extracted with methylene chloride. The combined organic solution was washed with water, dried over anhydrous sodium sulfate, filtered and evaporated to dryness under reduced pressure. There was thus produced 5,6-dibromo-16α,17α-oxido-pregnan-21-ol-3,11,20-trione acetate in crude form. The analytical sample was obtained by recrystallization from acetone-hexane.

10 g. of crude 5,6-dibromo-16α,17α-oxido-pregnan-21-ol-3,11,20-trione acetate was dissolved in 100 cc. of methanol and then under stirring mixed with 4 g. of zinc dust, while the temperature was kept below 40° C. The stirring was continued for half an hour further and the supernatant solution was decanted and filtered. There was thus obtained a clear solution of 16α,17α-oxido-Δ⁵-pregnen-21-ol-3,11,20-trione acetate. In another experiment the compound was isolated by pouring the solution into water, extracting with ether, washing with water, evaporating to dryness and recrystallizing the residue from acetone-hexane.

The solution of 16α,17α-oxido-Δ⁵-pregnen-21-ol-3,11,20-trione 21-acetate, obtained as described above, was treated with 3 cc. of concentrated hydrochloric acid and stirred at room temperature for 10 minutes. After diluting with water, the product was extracted with methylene chloride, washed with water, dried over anhydrous sodium sulfate, filtered and evaporated to dryness. Crystallization of the residue from acetone-hexane yielded 16α,17α-oxido-Δ⁴-pregnen-21-ol-3,11,20-trione 21-acetate.

To a solution of 5 g. of 16α,17α-oxido-Δ⁴-pregnen-21-ol-3,11,20-trione acetate in 40 cc. of glacial acetic acid there was added 30 cc. of a 30% solution of hydrogen bromide in glacial acetic acid, under continuous stirring. The color of the solution quickly changed and the bromohydrin, namely 16β-bromo-Δ⁴-pregnen-17α,21-diol-3,11,20-trione acetate, started to precipitate. The stirring was continued at room temperature for half an hour and the mixture was then diluted with water. The precipitate was collected by filtration and washed with water. The analytical sample was obtained by recrystallization from acetone-hexane.

5 g. of the still moist crude bromohydrin obtained above was added to a suspension of 7.5 g. of Raney nickel in 150 cc. of methanol and the mixture was refluxed for 2 hours. The catalyst was removed by filtration under nitrogen and the filtrate was concentrated until precipitation. The precipitate was filtered from the cooled mixture, washed with water, dried and recrystallized from acetone-hexane, thus furnishing cortisone 21-acetate which was identical with an authentic sample of the product.

*Example II*

In another experiment, 10 g. of Δ⁵,¹⁶-pregnadien-3β-ol-11,20-dione acetate in mixture with 75 cc. of chloroform and 1 lt. of methanol was treated with 40 cc. of 30% hydrogen peroxide followed by 20 cc. of 5 N sodium hydroxide solution, at temperatures around room temperature, and the mixture was stirred for 16 hours; it was then acidified with acetic acid and the resulting 16α,17α-oxido-Δ⁵-pregnen-3β-ol-11,20-dione was isolated by extraction with chloroform.

*Example III*

In another experiment 16α,17α-oxido-Δ⁵-pregnen-3β-ol-11,20-dione acetate in methylene chloride solution was treated with one molar equivalent of bromine to produce a solution of 5,6-dibromo-16α,17α-oxido-pregnan-3β-ol-11,20-dione acetate in methylene chloride. This solution was then treated with hydrogen bromide in acetic acid and the resulting solution of 5,6,16β-tribromo-pregnan-3β,17α-diol-11,20-dione 3-acetate was treated with another molar equivalent of bromine dissolved in methylene chloride. By addition of water and subsequent extraction with methylene chloride and concentration under reduced pressure, there was obtained 5,6,16β,21-tetrabromo-pregnan-3β,17α-diol-11,20-dione 3-acetate, identical with the product obtained in accordance with Example I.

*Example IV*

A solution of 10 g. of 16α,17α-oxido-Δ⁵-pregnen-3β-ol-11,20-dione acetate in 200 cc. of methylene chloride was treated with 4.2 g. of bromine dissolved in 30 cc. of methylene chloride and with 15 cc. of glacial acetic acid containing 5 g. of dry hydrogen bromide, at room temperature. The solution was then heated to 40° C. and treated with 8.4 g. of bromine dissolved in 60 cc. of methylene chloride, which was added in small portions and waiting until decoloration before each addition and under stirring. The mixture was stirred at 40° C. for 20 minutes further, the methylene chloride was removed by distillation under reduced pressure, avoiding overheating, and the suspension obtained was poured into ice water. The precipitate was filtered, washed with water and dried in vacuo. There was thus obtained the crude 5,6,12,16β,21-pentabromo-pregnan-3β,17α-diol-11,20-dione 3-acetate. The pure compound was isolated in another experiment after recrystallization from methanol.

The crude 5,6,12,16β,21-pentabromo-pregnan-3β,17α-diol-11,20-dione 3-acetate was mixed with 100 cc. of methanol and a slow stream of dry hydrogen chloride was introduced into the solution for 90 minutes and keeping the temperature around 30° C. After diluting with water the precipitate was filtered, washed with water and dried in vacuo, thus yielding the free 5,6,12,16β,21-pentabromo-pregnan-3β,17α-diol-11,20-dione in crude form. In another experiment the pure substance was prepared by recrystallization from methanol.

The above crude 5,6,12,16β,21-pentabromo-pregnan-3β,17α-diol-11,20-dione was mixed with 200 cc. of methanol and 32 g. of sodium iodide, stirred for 15 minutes at room temperature and kept standing overnight. After dilution with water, the product was extracted with methylene chloride, washed with 3% sodium thiosulfate solution until decoloration and with water, dried over anhydrous sodium sulfate, filtered and evaporated to dryness under reduced pressure in a bath kept at a temperature below 35° C. There was thus obtained 12,16β-dibromo-21-iodo-$\Delta^5$-pregnen-3β,17α-diol-11,20-dione in crude form. The analytical sample was prepared by recrystallization from acetone-methanol at low temperature.

The crude 12,16β-dibromo-21-iodo-$\Delta^5$-pregnen-3β,17α-diol-11,20-dione was dissolved in 300 cc. of acetone, mixed with 40 g. of recently fused potassium acetate and refluxed for 4 hours. The mixture was concentrated to a small volume, diluted with water and extracted with ether. The extract was washed with water, dried over anhydrous sodium sulfate, filtered and concentrated to a small volume. Upon cooling there crystallized 12-bromo-16α,17α-oxido-$\Delta^5$-pregnen-3β,21-diol-11,20-dione 21-acetate. The analytical sample was obtained by crystallization from acetone.

10 g. of the 12-bromo-16α,17α-oxido-$\Delta^5$-pregnen-3β,21-diol-11,20-dione 21-acetate was dissolved in 50 cc. of methylene chloride, cooled to 10° C. and treated with 4 g. of bromine dissolved in 10 cc. of methylene chloride, with stirring and keeping the temperature below 15° C., in the course of 20 minutes. There was thus obtained a solution of 5,6,12-tribromo-16α,17α-oxido-pregnan-3β,21-diol-11,20-dione 21-acetate which was used for the next stage without isolation of the pure compound. The latter was obtained in another experiment by concentration of the methylene chloride solution under reduced pressure and recrystallization of the residue from acetone.

To the above solution of 5,6,12-tribromo-16α,17α-oxido-pregnan-3β,21-diol-11,20-dione 21-acetate there was added 100 cc. of 90% acetic acid and then 3.8 g. of chromium trioxide in 10 cc. of water in the course of half an hour, with stirring and keeping the temperature below 25° C. The mixture was stirred for 1 hour further at room temperature, diluted with water and 200 cc. of methylene chloride and the organic phase was separated. The aqueous layer was re-extracted with methylene chloride and the combined methylene chloride solution was washed with water, dried over anhydrous sodium sulfate, filtered and evaporated to dryness under reduced pressure. There was thus obtained the crude 5,6,12-tribromo-16α,17α-oxido-pregnan-21-ol-3,11,20-trione acetate. The analytical sample was obtained by recrystallization from acetone-hexane.

10 g. of the crude 5,6,12-tribromo-16α,17α-oxido-pregnan-21-ol-3,11,20-trione acetate was dissolved in 200 cc. of methanol, mixed with 40 g. of sodium iodide and then the reaction product was worked up as described above for the reaction of 5,6,12,16β,21-pentabromo-3β,17α-diol-11,20-dione with sodium iodide. The pure substance was obtained by recrystallization from acetone-hexane. The crude 12-bromo-16α,17α-oxido-$\Delta^5$-pregnen-21-ol-3,11,20-trione acetate was mixed with 100 cc. of methanol followed by 3 cc. of concentrated hydrochloric acid and the mixture was stirred at room temperature for 10 minutes. After diluting with water the product was extracted with methylene chloride, washed with water, dried over anhydrous sodium sulfate, filtered and evaporated to dryness. The residue crystallized from acetone-hexane to furnish 12-bromo-16α,17α-oxido-$\Delta^4$-pregnen-21-ol-3,11,20-trione acetate.

To a solution of 5 g. of 12-bromo-16α,17α-oxido-$\Delta^4$-pregnen-21-ol-3,11,20-trione acetate in 100 cc. of glacial acetic acid there was added 2 cc. of a 30% solution of hydrogen bromide in acetic acid, dropwise and under mechanical stirring. The color of the reaction mixture quickly changed and the bromohydrin started to precipitate. The stirring was continued at room temperature for half an hour and the mixture was then diluted with water, cooled and the precipitate was filtered and washed with water; there was thus obtained 12,16β-dibromo-$\Delta^4$-pregnen-17α,21-diol-3,11,20-trione 21-acetate in crude form which without drying was used for the next stage. The analytical sample was obtained by recrystallization from acetone-hexane.

5. g. of the above crude wet bromohydrin was added to a suspension of 15 g. of Raney nickel in 200 cc. of methanol and the mixture was refluxed for 4 hours and filtered under nitrogen; the filtrate was concentrated until an abundant precipitate separated and cooled. The precipitate was filtered, washed with water, dried and recrystallized from acetone-hexane, thus giving cortisone 21-acetate, identical with an authentic sample of the compound.

*Example V*

5 g. of the crude 5,6,12-tribromo-16α,17α-oxido-pregnan-21-ol-3,11,20-trione acetate, obtained as described in Example IV, was mixed with 50 cc. of methanol and 3 g. of zinc dust which was added in small portions, with stirring and maintaining the temperature below 40° C. The mixture was stirred for 1 hour further and then filtered, washing the filter with methanol. The combined filtrate and washings afforded a solution of 16α,17α-oxido-$\Delta^5$-pregnen-21-ol-3,11,20-trione acetate; in another experiment the pure compound was isolated by addition of water, filtration of the precipitate and crystallization from acetone-hexane.

By treatment with hydrochloric acid the double bond of 16α,17α-oxido-$\Delta^5$-pregnen-21-ol-3,11,20-trione was rearranged to the $\Delta^4$ position, then formed its bromohydrin and finally substituted the bromine atom of the latter for a hydrogen atom, thus yielding cortisone 21-acetate, identical with the final compound of Example IV. These reactions are similar to those of the transformation of 12-bromo-16α,17α-oxido-$\Delta^5$-pregnen-21-ol-3,11,20-trione acetate into cortisone 21-acetate described in Example IV.

We claim:

1. A process for the production of the lower fatty acid esters of 16α,17α-oxido-$\Delta^5$-pregnen-3β-ol-11,20-dione comprising selectively acylating 11α-hydroxy-diosgenin in an inert solvent at low temperature to form the 3-lower fatty acid esters thereof, oxidizing the esters with an oxidizing agent to form the 3-lower fatty acid esters of 11-keto-diosgenin, oxidatively degrading the side chain of the last mentioned esters to form the corresponding 3-lower fatty acid esters of $\Delta^{5,16}$-pregnadien-3β-ol-11,20-dione, epoxidizing the last mentioned compound with a peroxidizing agent to form 16α,17α-oxido-$\Delta^5$-pregnen-3β-ol-11,20-dione and esterifying this last mentioned compound with a lower fatty acid anhydride.

2. The process of claim 1 wherein the oxidizing agent is chromium trioxide in acetic acid and the peroxidizing agent is hydrogen peroxide in the presence of an alkali metal hydroxide.

3. A process for the production of cortisone acetate comprising reacting 16α,17α-oxido-$\Delta^5$-pregnen-3β-ol-11,20-dione acetate with bromine and HBr to form a 5,6,16β,21-tetrabromo-17α-hydroxy derivative thereof, reacting the tetrabromo derivative with sodium iodide and with potassium acetate to form a 21-acetate and remove the 5,6 and 16β bromo groups and reconstitute the 16α,17α-oxido group, oxidizing the 3-hydroxy group to a 3-keto group, again reacting the compound thus formed with HBr to form a 16β-bromo17α-hydroxy compound and removing the 16β-bromo group.

4. The process of claim 3 wherein the tetrabromo derivative is further substituted with bromine at C–12.

5. The process of claim 3 wherein the 16β-bromo group is removed with Raney nickel.

6. The process of claim 4 wherein the 12-bromo group and 16β-bromo group are removed with Raney nickel.

7. 5,6 - dibromo - 16α,17α-oxido-pregnan-3β-ol-11,20-dione acetate.

8. 5,6,16β - tribromo-pregnan-3β,17α-diol-11,20-dione 3-acetate.

9. A compound selected from the class consisting of 5,6,16β,21 - tetrabromo - pregnan-3β,17α-diol-11,20-dione and its 3-mono lower fatty acid esters.

10. 16β - bromo-21-iodo-Δ$^5$-pregnen-3β,17α-diol-11,20-dione.

11. 16α,17α - oxido-Δ$^5$-pregnen-3β,21-diol-11,20-dione 21-monoacetate.

12. 5,6 - dibromo-16α,17α-oxido-pregnan-3β,21-diol-11,20-dione 21-acetate.

13. 5,6 - dibromo-16α,17α-oxido-pregnan-21-ol-3,11,20-trione 21-acetate.

14. 16α,17α - oxido-Δ$^5$-pregnen-21-ol-3,11,20-trione-21-acetate.

15. A compound selected from the group consisting of 5,6,12,16β,21 - pentabromo-pregnan-3β,17α-diol-11,20-dione and its 3-mono lower fatty acid esters.

16. 12,16β - dibromo - 21-iodo-Δ$^5$-pregnen-3β,17α-diol-11,20-dione.

17. 12 - bromo - 16α,17α-oxido-Δ$^5$-pregnen-3β,21-diol-11,20-dione 21-monoacetate.

18. 5,6,12 - tribromo - 16α,17α-oxido-pregnan-3β,21-diol-11,20-dione 21-monoacetate.

19. 5,6,12 - tribromo - 16α,17α-oxido-pregnan-21-ol-3,11,20-trione acetate.

20. 12 - bromo - 16α,17α-oxido-Δ$^5$-pregnen-21-ol-3,11,20-trione acetate.

21. 12 - bromo - 16α,17α-oxido-Δ$^4$-pregnen-21-ol-3,11,20-trione acetate.

22. 12,16β - dibromo-Δ$^4$-pregnen-17α,21-diol-3,11,20-trione 21-acetate.

References Cited in the file of this patent
UNITED STATES PATENTS

| | | |
|---|---|---|
| 2,596,562 | Kaufmann et al. | May 13, 1952 |
| 2,602,804 | Kendall | July 8, 1952 |
| 2,684,364 | Jones | July 20, 1954 |
| 2,752,339 | Julian et al. | June 26, 1956 |
| 2,776,969 | Rosenkranz et al. | Jan. 8, 1957 |
| 2,816,108 | Julian et al. | Dec. 10, 1957 |
| 2,899,428 | Rothman et al. | Aug. 11, 1959 |